(12) United States Patent
Buck et al.

(10) Patent No.: US 9,789,661 B2
(45) Date of Patent: Oct. 17, 2017

(54) STRUCTURAL GLASS ELEMENT AND METHOD FOR ITS PRODUCTION

(71) Applicant: SIKA TECHNOLOGY AG, Baar (CH)

(72) Inventors: Manuel Buck, Gebenstorf (CH); Ulli Mueller, Birmensdorf (CH); Enrico Cutri, Zurich (CH); Florian Doebbel, Widen (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 13/770,324

(22) Filed: Feb. 19, 2013

(65) Prior Publication Data
US 2013/0236689 A1 Sep. 12, 2013

(30) Foreign Application Priority Data
Mar. 9, 2012 (EP) .................... 12158888

(51) Int. Cl.
| | |
|---|---|
| B32B 3/14 | (2006.01) |
| B32B 5/00 | (2006.01) |
| B32B 3/30 | (2006.01) |
| C09D 183/04 | (2006.01) |
| C03C 17/30 | (2006.01) |
| C03C 27/04 | (2006.01) |
| E04F 13/14 | (2006.01) |
| B05D 1/02 | (2006.01) |
| B05D 3/12 | (2006.01) |
| B05D 1/28 | (2006.01) |

(52) U.S. Cl.
CPC .................. B32B 3/30 (2013.01); B32B 3/14 (2013.01); B32B 5/00 (2013.01); C03C 17/30 (2013.01); C03C 27/048 (2013.01); C09D 183/04 (2013.01); E04F 13/145 (2013.01); C03C 2218/112 (2013.01); C03C 2218/114 (2013.01); C03C 2218/118 (2013.01); Y10T 428/24174 (2015.01); Y10T 428/24339 (2015.01); Y10T 428/24802 (2015.01); Y10T 428/269 (2015.01); Y10T 428/31612 (2015.04)

(58) Field of Classification Search
CPC .. B32B 3/30; B32B 3/266; B32B 5/00; B32B 5/142; B32B 3/14; B32B 15/02; B32B 15/04; B32B 15/08; B32B 15/20; B32B 17/06; B32B 17/064; B32B 17/01; B32B 17/10018; B32B 17/10798; B32B 17/061; B32B 2419/00; B32B 2383/00; B32B 27/08; B32B 27/20; B32B 27/283; B32B 2250/03; E04F 13/0812; E04F 13/083; E04F 13/0816; E04F 13/145; C09D 183/04; C03C 17/30; C03C 27/048; B05D 3/12; B05D 1/02; B05D 1/28
USPC .... 428/137, 138, 139, 119, 195.1, 207, 429, 428/447; 52/235, 311.3
See application file for complete search history.

(56) References Cited

U.S. PATENT DOCUMENTS

| | | | | |
|---|---|---|---|---|
| 4,115,356 | A * | 9/1978 | Hilliard | ........................... 528/18 |
| 4,506,482 | A * | 3/1985 | Pracht | ...................... E04B 2/88 |
| | | | | 52/235 |
| 4,814,230 | A | 3/1989 | Vockler | |
| 5,301,484 | A * | 4/1994 | Jansson | ................. E04F 13/145 |
| | | | | 52/122.1 |
| 7,309,734 | B2 | 12/2007 | Vockler | |
| 2009/0202842 | A1 | 8/2009 | Vockler et al. | |

FOREIGN PATENT DOCUMENTS

| | | |
|---|---|---|
| DE | 4107424 A1 | 9/1992 |
| EP | 0 347 049 A2 | 12/1989 |

OTHER PUBLICATIONS

Oct. 23, 2012 European Search Report issued in Application No. EP 12158888.3 (with translation).
Oct. 23, 2012 European Written Opinion issued in Application No. EP 12158888.3 (with translation).
Feb. 29, 2016 Office Action issued in Chinese Patent Application No. 201380012432.8.
Oct. 2016 Office Action issued in Chinese Patent Application No. 201380012432.8.
Mar. 6, 2017 Office Action issued in European Application No. 13 710 340.4.
Apr. 12, 2017 Office Action issued in Chinese Application No. 201380012432.8.
Translation dated Sep. 9, 2014 International Preliminary Report on Patentability issued in International Patent Application No. PCT/EP2013/054780.

* cited by examiner

*Primary Examiner* — Joanna Pleszczynska
(74) *Attorney, Agent, or Firm* — Oliff PLC

(57) ABSTRACT

In the case of a structural glass element with a plastic-coated glass panel and at least one assembly element attached hereon, the glass panel is coated in particular with a silicone-based elastomer across its entire surface, and the coating at the same time creates an adhesive joint with one section of the assembly element supported on the glass panel.

12 Claims, No Drawings

STRUCTURAL GLASS ELEMENT AND METHOD FOR ITS PRODUCTION

TECHNICAL FIELD

The invention relates to a structural glass element with a plastic-coated glass panel and with at least one mounting element attached hereon, as well as a method for producing such.

PRIOR ART

Facades and roofing, which consist either entirely or at any rate to a significant extent of glass, have become an integral part of modern architecture. They are mostly formed from flat glass panels, which are inserted into suitable (usually consisting of steel) supporting structures. These glass panels are frequently colored and/or provided with functional coatings, such as to keep away infrared radiation from the inside of a building or to realize certain optical effects.

Glass panels with vapor-deposited thin films are particularly known, which increase the reflection capacity and the infrared range and partly also in the visible range and in the UV range. To produce high quality glazing, which has an opaque appearance, a complex and expensive stripping treatment of the glass surface is normally performed.

It is also known from U.S. Pat. No. 4,814,230 or from U.S. Pat. No. 7,309,734 B2, for example, to produce opaque glass panels or such with particular optical characteristics by the application of a pigment-containing elastomer coating, which can certainly satisfy the high quality requirements.

DISCLOSURE OF THE INVENTION

The invention provides a structural glass element with the Features of Claim 1. Furthermore, multiple methods for its manufacture are stated.

One aspect of the invention is that a coating, primarily used for creating optical effects, of a glass panel provided as a structural element is simultaneously used for purposes of mounting. That is why this means in particular a departure from the usual course of action one skilled in the art would take, because coatings with mounting action (especially adhesive coatings) are normally formed only in partial areas of larger parts, which are required for adequate transmission of force. With the coatings at issue however the plastic coating is typically, but not necessarily, applied on the entire surface of the glass panel. Using these coatings at the same time for firmly bonding a mounting element onto the glass panel is an equally surprising as well as advantageous idea. This idea facilitates significant simplifications and cost savings in the production process, because an additional application of adhesive which must moreover be typically exactly locally limited, is no longer necessary.

A further advantage of the invention consist in that the plastic coating (especially a silicone-based elastomer coating) which must be formed relatively thick for the purpose of attaching the mounting element, improves the fracture behavior of the structural glass element and makes it easier to comply with safety regulations. The elastomer coating retains fragments up to a certain degree within the bond structure of the structural element and it can therefore contribute to prevent them from falling down or flying away.

In one embodiment of the invention, the supported section of the or each mounting element is formed by a perforated metal sheet, the holes of which are penetrated at least partially by the coating of the glass panel. This embodiment is flexible in its application, because a large variety of simple perforated metal sheets are commercially available inexpensively, and facilitate a particularly close positive engagement between the glass panel and the mounting element as well as obtaining a very high joint strength.

A further embodiment of the invention provides that the surface of the glass panel is covered by more than a quarter, particularly by a predominant portion of the surface, with the supported section of the mounting element or the supported sections of multiple mounting elements. This permits a good, advantageous distribution of power during the assembly of the structural glass elements and prevents peak loads and the risk of resulting fracture.

In a further embodiment, the mounting element or at least one mounting element includes a mounting bracket projecting upright from the supporting section. The mounting brackets can be formed in a technologically simple and cost-effective manner by bending the edges of the preferably used perforated metal sheet and can (provided with corresponding openings) be flexibly used for different assembly situations.

In further embodiments of the invention, the coating has a thickness in the range between 1 and 7 mm, in particular in the range between 2 and 5 mm. The coating of the glass panel therefore involves a thick coating, the exact thickness of which must be determined depending on the thickness and size of the glass panel and the specific allocation of mounting elements according to the assembly requirements.

In a further embodiment, the coating is densely colored or pigmented such that the visible area of the structural glass element is non-transparent and covers the or each mounting element. This ensures an optically high-quality appearance of a facade or reconstruction or similar formed with the structural glass elements, irrespective of the actual configuration of the substructure and allocated mounting elements. If the coating has a specified preferred thickness, it can in particular also be colored or pigmented white and at the same time cover any substructure; this is obviously likewise applicable for a black or colored pigmentation or coloring.

In the case of the coating of the structural glass element, this particularly involves a silicone-based elastomer or a silicone coating, i.e. that the starting material for the coating is a silicone composition.

Silicone compositions that are particularly suitable for the coating are in particular condensation cross-linked two-component silicone compositions. Preferably this will be a two-component silicone composition consisting of a component A, comprising at least one hydroxyl group terminated polydiorganosiloxane P; and a component B comprising at least one cross-linking agent for polydiorganosiloxanes; as well as at least one catalyst for the cross-linking of polydiorganosiloxanes.

Suitable polydiorganosiloxanes are in particular polydiorganosiloxane P of the formula (I),

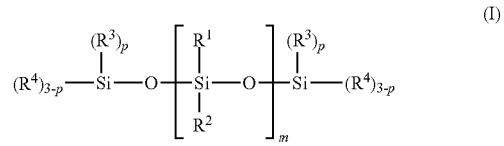

wherein the radicals $R^1$, $R^2$ and $R^3$ stand independently of one another for linear or branched, mono-valent hydrocarbon radicals with 1-12 C atoms, which possibly exhibit one or several hetero atoms and possibly one or several C—C multiple bonds and/or possibly cycloaliphatic and/or aromatic components;

the $R^4$ radicals stand independently of one another for hydroxyl groups or for alkoxy, acetoxy or ketoxime groups with 1-13 C atoms each, which possibly exhibit one or several hetero atoms and possibly one or several C—C multiple bonds and/or possibly cycloaliphatic and/or aromatic components;

the index p stands for a value of 0, 1 or 2; and the index m is selected such that the polydiorganosiloxane P comprises a viscosity of 10 to 500,000 MPa at a temperature of 23° C.

The $R^1$ and $R^2$ radicals stand in particular for alkyl radicals with 1 to 5, in particular with 1 to 3, C atoms, preferably for methyl groups.

The index m is furthermore particularly selected such that the polydiorganosiloxane P has a viscosity of 1000 to 100,000 MPa at a temperature of 23° C. The viscosity is typically determined pursuant to DIN 53018.

If the polydiorganosiloxane P in the component A of the two-component silicone composition is a hydroxide group terminated polydiorganosiloxane, the index p typically stands for a value of 2. Hydroxyl group terminated polydiorganosiloxanes are known and commercially available. The manufacture of such polydiorganosiloxanes is also done in the known manner. This is described in U.S. Pat. No. 4,962,152, for example, the disclosure of which is herewith incorporated by reference.

If the polydiorganosiloxane P in the component A of the two-component silicone composition is a polydiorganosiloxane P of the formula (I), in which the $R^4$ radicals stand for alkoxy, acetoxy or ketoxime groups, these are particularly alkoxy or ketoxime groups. Then the index p stands in particular for a value of 0 or 1.

Preferred alkoxy groups are methoxy, ethoxy or iso-propoxy groups.

Preferred ketoxime groups are dialkylketoxime groups the alkyl groups of which exhibit respectively 1 to 6 C atoms. The two alkyl groups of the dialkylketoxime preferably stand independently from one another for methyl, ethyl, n-propyl, isopropyl, n-butyl or isobutyl groups. Especially preferred are those cases, in which one alkyl group of the dialkylketoxime stands for a methyl group and the other alkyl group of the dialkylketoxime stands for a methyl, ethyl or for an isobutyl group. The ketoxime group most preferably stands for an ethyl methyl ketoxime group.

The component B of the two-component silicone composition includes at least one cross-linking agent for polydiorganosiloxanes. The cross-linking agent is in particular a silane of the formula (II).

(II)

In this context, the $R^6$ radical stands independently of one another for a linear or branched, mono-valent hydrocarbon radical with 1-12 C atoms, which possibly exhibits one or several hetero atoms and possibly one or several C—C multiple bonds and/or possibly cycloaliphatic and/or aromatic components.

The $R^7$ radical stands independently of one another for a hydrogen atom, or for an alkyl radical with 1 to 12 C atoms, or for an oxime radical with 1 to 12 C atoms, or for an acyl radical with 1 to 12 C atoms. The $R^7$ radical particularly stands for an alkyl residue with 1 to 5, in particular 1 to 3, C atoms, preferably for a methyl or for an ethyl group.

The index s stands for a value of 0 to 4, in particular for a value of 0, 1 or 2, preferably for a value of 0.

Selecting the silane of the formula (II) as cross-linking agent for polydiorganosiloxanes, different requirements can be decisive for the silicone composition. The reactivity of the silane can play an important role on the one hand, wherein on the other, higher-reactive silanes are preferred, in principle. But on the other hand, even toxicological reasons can be decisive for the selection of the cross-linking agent. For that reason, tetraethoxysilane is preferred as cross-linking agent compared to tetramethoxysilane, for example.

Examples of suitable silanes of the formula (II) are methyltrimethoxysilane, chloromethyltrimethoxysilane, ethyltrimethoxysilane, propyltrimethoxysilane, vinyltrimethoxysilane, methyltriethoxysilane, vinyltriethoxysilane, phenyltriethoxysilane, methyltripropoxysilane, phenyltripropoxysilane, tetramethoxysilane, tetraethoxysilane, tetra-n-propoxysilane or tetra-n-butoxysilane. The silane of formula (II) is particular preferably vinyltrimethoxysilane or tetraethoxysilane, or a mixture thereof.

The silanes can furthermore also already exist partially (a part of all $R^7$=H) or completely hydrolyzed (all $R^7$=H). Because of the greatly increased reactivity of partially or completely hydrolyzed silanes, their use as cross-linking agents can be advantageous. In this context, one skilled in the art knows that when using partially or completely hydrolyzed silanes for the formation of oligomeric siloxanes, it is possible that particularly dimers and/or trimers can be formed, which are formed by the condensation of hydrolyzed silanes. Consequently, even oligomeric siloxanes can be used as cross-linking agents for the two-component silicone composition. Suitable oligomeric siloxanes, for example, are hexamethoxydisiloxane, hexaethoxydisiloxane, hexa-n-propoxydisiloxane, hexa-n-butoxydisiloxane, octaethoxytrisiloxane, octa-n-butoxytrisiloxane and decaethoxytetrasiloxane.

It is obviously also possible to use any mixture of the above-mentioned silanes as cross-linking agents for the two-component silicone composition.

The proportion of the cross-linking agent for polydiorganosiloxanes is preferably 0.1 to 20% by weight, in particular 1 to 15% by weight, preferably 2 to 10% by weight of the total silicone composition.

Regarding the catalyst for the cross-linking of polydiorganosiloxanes, this will particularly be an organotin compound, or a titanate, or a combination thereof.

Preferred organotin compounds are dialkyltin compounds, such as they are selected for example from the group consisting of dimethyltindi-2-ethylhexanoate, dimethyltindilaurate, di-n-butyltindiacetate, di-n-butyltindi-2-ethylhexanoate, di-n-butyltindicaprylate, di-n-butyltindi-2,2-dimethyloctanoate, di-n-butyltindilaurate, di-n-butyltindistearate, di-n-butyltindimaleinate, di-n-butyltindioleate, di-n-butyltindiacetate, di-n-octyltindi-2-ethylhexanoate, di-n-octyltindi-2,2-dimethyloctanoate, di-n-octyltindimaleinate and di-n-octyltindilaurate. Compounds are referred to as titanates or organotitanates, which exhibit at least one ligand that is bonded to the titanium atom by means of an oxygen atom. Ligands bonded to the titanium atom by means of an oxygen/titanium bond are particularly those that are selected from the group consisting of the alkoxy group, sulfonate group, carboxylate group, dialkyl phosphate group, dialkyl pyrophosphate group and acetylacetonate group. Preferred titanates are tetrabutyl titanate or tetraisopropyl titanate, for example.

Furthermore suitable titanates exhibit at least one multi-dentate ligand, also called chelate ligand. The multi-dentate ligand is preferably a bidentate ligand.

Suitable titanates are commercially available from the DuPont Company, USA, under the trade names of Tyzor® AA, GBA, GBO, AA-75, AA-65, AA-105, DC, BEAT, IBAY.

It is obviously possible or even preferred in certain cases to use mixtures of different catalysts. The catalyst is a mixture of an organotin compound with a titanate, for example.

The percentage of the catalyst for the cross-linking of polydiorganosiloxanes is preferably 0.001 to 10% by weight, in particular 0.005 to 4% by weight, preferably 0.01 to 3% by weight of the entire two-component silicone composition.

The two-component silicone composition can possibly still contain further constituents.

Such type of additional constituents are in particular softeners, inorganic and/or organic filler materials, curing accelerators, pigments, adhesion promoters, processing resources, rheology modifiers, stabilizers, dyes, inhibitors, heat stabilizers, antistatics, flame retardants, biocides, waxes, flow-control agents, thixotropic agents, and further known raw materials and additives known to one skilled in the art.

Further suitable constituents, in particular adhesion promoters and softeners, which can be contained in the two-component silicone composition, are described in paragraphs [0051] to [0055] of the patent application US 2010/063190 A1, for example, the entire disclosure of which is herewith incorporated by reference.

During the use of such type of optional constituents, it is important to note that constituents, which may impair the storage stability of the composition as a result of inter-reaction or reaction with other constituents, are separately stored.

It is furthermore advantageous to select all previously mentioned constituents which may also be contained in the two-component silicone composition such that the storage stability of both components of the two-component silicone composition will not be affected negatively by the presence of such a constituent, i.e. that the properties of the composition, in particular the application and curing properties, will not change during storage or only very slightly. This requires that any reactions resulting in the chemical curing of the described two-component silicone composition will not occur to a significant degree during the storage.

Trialkylsilyl-terminated polydialkyl siloxanes are particularly suitable as softeners, in particular trimethylsilyl-terminated polydimethyl siloxanes. Trimethylsilyl-terminated polydimethyl siloxanes with viscosities between 1 and 10,000 MPa are preferred. Particularly preferred are viscosities between 10 and 1000 MPa. However, it is also possible to use trimethylsilyl-terminated polydimethyl siloxanes, in which some of the methyl groups are substituted by other organic groups such as phenyl, vinyl or trifluoropropyl. Although preferably preferred linear trimethylsilyl-terminated polydimethylsiloxanes are used as softeners, also branched compounds can be used. Such branched compounds are created by the fact that small quantities of trifunctional or tetrafunctional silanes are used in the base materials for their manufacture. But is also possible to use other organic compounds instead of the polysiloxane softeners, such as certain hydrocarbons or mixtures thereof, as softeners. Such hydrocarbons can be aromatic or aliphatic. During the selection it must particularly be ensured that these hydrocarbons have low volatility and sufficient compatibility with the other constituents of the silicone composition. The percentage of the softener is preferably 2 to 15% by weight, in particular 5 to 10% by weight, of the entire two-component silicone composition.

The composition can furthermore comprise at least one filler material. The filler material influences the rheological properties of the uncured composition as well as the mechanical properties and the surface condition of the cured composition. A filler material can furthermore influence the appearance of the silicone composition, particularly in the cured condition.

Suitable filler materials are natural, ground or precipitated calcium carbonates, for example, which may have been coated with fatty acids, in particular stearic acid, calcined kaolins, aluminum oxides, aluminum hydroxides, silicic acids, in particular highly dispersed silicic acids from pyrolysis processes, carbon black, particularly industrially produced carbon black, aluminum silicates, magnesium aluminum silicates, zirconium silicates, silica flour, cristobalite flour, diatomaceous earth, mica, iron oxides, titanium oxides, zirconium oxides, gypsum, annalin, barium sulfate ($BaSO_4$, also called barite or heavy earth), boron carbide, boron nitride, graphite, carbon fibers, glass fibers or hollow glass spheres, the surface of which may have been treated with a hydrophobic agent. Preferred filler materials are calcium carbonates, calcined kaolins, carbon black, highly dispersed silicic acids as well as flame retarding filler materials, such as hydroxides or hydrates, in particular hydroxides or hydrates of aluminum, preferably aluminum hydroxide.

In a preferred embodiment, the silicone composition contains highly dispersed silicic acids from pyrolysis processes or calcium carbonate as filler material.

It is absolutely possible and can even be an advantage to utilize a mixture of different filler materials.

A suitable filler material quantity is in the range of 1 to 40% by weight, in particular 5 to 30% by weight, preferably 10 to 20% by weight, for example, relative to the entire two-component silicone composition.

In a likewise preferred embodiment, the two-component silicone composition contains none or only small quantities of filler materials.

In a particularly preferred embodiment, the two-component silicone composition contains a preparation for dyeing of the compositions, wherein this preparation in particular is a color paste or a pigment.

During the application of the two-component silicone composition, the components A and B are mixed together, for example by stirring, kneading, rolling or suchlike, or in a mixer or by means of a static mixer, which results in curing the composition. The curing of the two-component silicone composition occurs particularly at room temperature.

The two-component silicone composition is particularly used such that the weight ratio of the component A to component B is >1:1, in particular from 3:1 to 15:1, preferably from 10:1 to 13:1.

In a variant of the proposed method, a starting material of the coating is poured or sprayed onto the glass panel in the liquid condition, such that a level surface is formed by flowing. In another embodiment it can be provided that the starting material of the coating is wiped onto the glass panel with a doctor blade in the liquid or pasty condition. Even a largely self-leveling pouring or spraying of the still (viscous) liquid composition followed by subsequent wiping-on with a doctor blade is possible to compensate for any differences in levels that may still exist. Alternatively, the method can be designed such that the starting material of the coating is rolled onto the glass panel in the pasty condition, wherein in particular a plastic film is inserted between the surface of the starting material and the surface of the coating roller, which is pulled-off again after the application and prior to the curing of the coating. This will prevent that the material will adhere to the rolling surface.

In one development of the mentioned embodiments, the liquid or pasty condition of the starting material will at least be adjusted among other things by adjusting a preliminary reaction time prior to the application onto the glass panel. It should be understood that besides other parameters, such as a solvent percentage, the temperature, etc., are important.

Regardless of the actual type of the application of the elastomer starting material, the or each mounting element to be attached is put onto the formed layer "floating" (or maybe slightly impressed), as long as the starting material has not yet reacted. Depending upon the composition and its reaction behavior, an assembly sequence is selected in particular which offers sufficient reserves in terms of time for a firmly bonded connection between the glass panel and the mounting element(s) by means of the elastomer coating. It can be useful to hold the mounting elements laterally fixed while putting them onto the still viscous or pasty starting material layer, until such time that they are adequately fixed themselves as the layer continues to cure.

The curing of the coating, depending upon the composition thereof, can occur sufficiently fast by air drying, but it is also possible to use infrared heaters, maybe introducing moist air or steam or other means known per se for accelerating this procedure.

The invention claimed is:

1. A structural glass element comprising a glass panel and at least one mounting element attached thereon,
    wherein the glass panel is coated on its entire surface with a silicone-based elastomer coating, and the silicone-based elastomer coating at the same time creates an adhesive joint with a section of the at least one mounting element supported on the glass panel,
    wherein the at least one mounting element comprises a metal sheet that is bent on at least one of its edges to define a mounting bracket projecting upright at an end of the metal sheet from a supported section of the metal sheet that is adhered over the surface of the glass panel, the mounting bracket being configured to be used to assemble the structural glass element, wherein the mounting element is floating on or impressed in the silicone-based elastomer coating, and
    wherein a starting material for the silicone-based elastomer coating is a condensation cross-linkable silicone composition comprising:
        a component A comprising:
            at least one hydroxyl group terminated polydiorganosiloxane P; and
        a component B comprising:
            at least one cross-linking agent for polydiorganosiloxanes, and
            at least one catalyst for the cross-linking of polydiorganosiloxanes.

2. The structural glass element according to claim 1, wherein the supported section of one or each mounting element is formed by a perforated metal sheet, the holes of which are penetrated at least partially by the silicone-based elastomer coating of the glass panel.

3. The structural glass element according to claim 1, wherein the surface of the glass panel is covered by more than a quarter, with the supported section of the mounting element or the supported sections of multiple mounting elements.

4. The structural glass element according to claim 1, wherein the silicone-based elastomer coating has a thickness in the range between 1 and 7 mm.

5. The structural glass element according to claim 1, wherein the silicone-based elastomer coating is densely pigmented such that the structural glass element is non-transparent in the visible range and the silicone-based elastomer coating covers the mounting element.

6. The structural glass element according to claim 1, wherein the two-component silicone composition in addition comprises at least one color paste or one color pigment.

7. The structural glass element according to claim 1, further comprising more than one assembly element.

8. The structural glass element according to claim 1, wherein the silicone-based elastomer coating has a thickness in the range between 2 and 5 mm.

9. A method for producing a structural glass element according to claim 1, wherein a starting material of the coating is poured or sprayed onto the glass panel in the liquid condition, such that a level surface is formed by flowing.

10. A method for producing a structural glass element according to claim 1, wherein a starting material of the coating is wiped onto the glass panel with a doctor blade in the liquid or pasty condition.

11. A method for producing a structural glass element according to claim 1, wherein a starting material of the coating is rolled onto the glass panel in the pasty condition, wherein in particular a plastic film is inserted between the surface of the starting material and the surface of the coating roller, which is pulled-off again after the application and prior to the curing of the coating.

12. The method according to claim 9, wherein the liquid or pasty condition of the starting material will at least be adjusted among other things by adjusting a preliminary reaction time prior to the application onto the glass panel.

* * * * *